(12) United States Patent
Quigley et al.

(10) Patent No.: US 8,839,822 B2
(45) Date of Patent: Sep. 23, 2014

(54) DUAL CONTAINMENT SYSTEMS, METHODS AND KITS

(75) Inventors: Peter A. Quigley, Duxbury, MA (US); Michael Feechan, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 1203 days.

(21) Appl. No.: 11/689,204

(22) Filed: Mar. 21, 2007

(65) Prior Publication Data

US 2008/0006337 A1 Jan. 10, 2008

Related U.S. Application Data

(60) Provisional application No. 60/784,656, filed on Mar. 22, 2006.

(51) Int. Cl.
| | |
|---|---|
| *F16L 11/00* | (2006.01) |
| *F16L 11/22* | (2006.01) |
| *F16L 11/127* | (2006.01) |
| *F16L 11/20* | (2006.01) |
| *F16L 9/19* | (2006.01) |

(52) U.S. Cl.
CPC . *F16L 9/19* (2013.01); *F16L 11/22* (2013.01); *F16L 11/127* (2013.01); *F16L 11/20* (2013.01)
USPC ........... 138/115; 138/104; 138/109; 138/116; 138/125

(58) Field of Classification Search
USPC .......................... 138/104, 109, 115, 116, 125
See application file for complete search history.

(56) References Cited

U.S. PATENT DOCUMENTS

| | | | |
|---|---|---|---|
| 142,388 | A | 9/1873 | Goble |
| 646,887 | A | 4/1900 | Stowe et al. |
| 2,099,407 | A | 11/1937 | Raymond |
| 2,178,931 | A | 11/1939 | Crites |
| 2,742,931 | A | 4/1956 | De Ganahl |
| 2,750,569 | A | 6/1956 | Moon |
| 2,969,812 | A | 1/1961 | De Ganahl |
| 2,973,975 | A | 3/1961 | Ramberg et al. |
| 2,991,093 | A | 7/1961 | Guarnaschelli |
| 3,167,125 | A | 1/1965 | Bryan |
| 3,170,137 | A | 2/1965 | Brandt |
| 3,212,528 | A | 10/1965 | Haas |
| 3,306,637 | A | 2/1967 | Press at al. |

(Continued)

FOREIGN PATENT DOCUMENTS

| | | |
|---|---|---|
| CA | 2282358 A1 | 8/1998 |
| DE | 19905448 A1 | 8/2000 |

(Continued)

OTHER PUBLICATIONS

International Search Report mailed on Nov. 8, 2005.

(Continued)

*Primary Examiner* — James Hook
(74) *Attorney, Agent, or Firm* — Goodwin Procter LLP

(57) ABSTRACT

A system for conveying a fluid is disclosed. Such system comprises a spoolable tube comprising an inner layer comprising a first layer and a reinforcing layer comprising fiber, which defines a first passage for conveying a first fluid; an outer layer; and one or more fittings adapted to engage an axial end of said inner layer and an axial end of said outer layer.

41 Claims, 4 Drawing Sheets

(56) References Cited

U.S. PATENT DOCUMENTS

| | | | |
|---|---|---|---|
| 3,354,292 A | 11/1967 | Kahn | |
| 3,383,223 A | 5/1968 | Rose | |
| 3,413,169 A | 11/1968 | Krings | |
| 3,459,229 A * | 8/1969 | Croft | 138/90 |
| 3,526,086 A | 9/1970 | Morgan | |
| 3,563,825 A | 2/1971 | Segura | |
| 3,589,752 A | 6/1971 | Spencer et al. | |
| 3,606,396 A | 9/1971 | Prosdocimo at al. | |
| 3,612,580 A | 10/1971 | Jones | |
| 3,654,967 A | 4/1972 | Atwell et al. | |
| 3,685,860 A | 8/1972 | Schmidt | |
| 3,696,332 A | 10/1972 | Dickson, Jr. et al. | |
| 3,790,438 A | 2/1974 | Lewis et al. | |
| 3,858,616 A | 1/1975 | Thiery et al. | |
| 3,866,633 A | 2/1975 | Taylor | |
| 3,907,335 A | 9/1975 | Burge et al. | |
| 3,932,559 A | 1/1976 | Cantor et al. | |
| 3,955,601 A | 5/1976 | Plummer, III | |
| 3,963,377 A | 6/1976 | Elliott et al. | |
| 3,980,325 A | 9/1976 | Robertson | |
| 4,001,442 A | 1/1977 | Stahlberger et al. | |
| 4,007,070 A | 2/1977 | Busdiecker | |
| 4,013,101 A | 3/1977 | Logan et al. | |
| 4,032,177 A | 6/1977 | Anderson | |
| 4,067,916 A | 1/1978 | Jaeger et al. | |
| 4,104,095 A | 8/1978 | Shaw | |
| 4,111,237 A | 9/1978 | Mutzner et al. | |
| 4,111,469 A | 9/1978 | Kavick | |
| 4,119,122 A | 10/1978 | de Putter | |
| 4,138,178 A * | 2/1979 | Miller et al. | 439/192 |
| 4,148,963 A | 4/1979 | Bourrain et al. | |
| 4,196,307 A | 4/1980 | Moore et al. | |
| 4,226,446 A | 10/1980 | Burrington | |
| 4,229,613 A * | 10/1980 | Braun | 174/47 |
| 4,303,263 A | 12/1981 | Legris | |
| 4,307,756 A | 12/1981 | Voigt et al. | |
| 4,330,017 A | 5/1982 | Satoh et al. | |
| 4,385,644 A | 5/1983 | Kaempen | |
| 4,417,603 A | 11/1983 | Argy | |
| 4,421,806 A | 12/1983 | Marks et al. | |
| 4,434,816 A * | 3/1984 | Di Giovanni et al. | 138/109 |
| 4,445,734 A | 5/1984 | Cunningham | |
| 4,469,729 A | 9/1984 | Watanabe et al. | |
| 4,652,475 A | 3/1987 | Haney et al. | |
| 4,706,711 A | 11/1987 | Czvikovszky et al. | |
| 4,712,813 A | 12/1987 | Passerell et al. | |
| 4,729,106 A | 3/1988 | Rush et al. | |
| 4,844,516 A | 7/1989 | Baker | |
| 4,854,349 A * | 8/1989 | Foreman | 138/89 |
| 4,869,293 A * | 9/1989 | Botsolas | 138/96 R |
| 4,913,657 A | 4/1990 | Naito et al. | |
| 4,936,618 A | 6/1990 | Sampa et al. | |
| 5,024,252 A | 6/1991 | Ochsner | |
| 5,072,622 A * | 12/1991 | Roach et al. | 73/40.5 R |
| 5,080,560 A | 1/1992 | LeRoy et al. | |
| 5,090,741 A | 2/1992 | Yokomatsu et al. | |
| 5,123,453 A | 6/1992 | Robbins | |
| 5,156,206 A | 10/1992 | Cox | |
| 5,257,663 A | 11/1993 | Pringle et al. | |
| 5,332,269 A | 7/1994 | Homm | |
| 5,343,738 A * | 9/1994 | Skaggs | 73/40.5 R |
| 5,348,088 A | 9/1994 | Laflin et al. | |
| RE34,780 E | 11/1994 | Trenconsky et al. | |
| 5,364,130 A | 11/1994 | Thalmann | |
| 5,373,870 A | 12/1994 | Derroire et al. | |
| 5,400,602 A | 3/1995 | Chang et al. | |
| 5,423,353 A * | 6/1995 | Sorensen | 138/109 |
| 5,437,899 A | 8/1995 | Quigley | |
| 5,452,923 A | 9/1995 | Smith | |
| 5,460,416 A | 10/1995 | Freidrich et al. | |
| 5,494,374 A * | 2/1996 | Youngs et al. | 405/52 |
| 5,507,320 A | 4/1996 | Plumley | |
| 5,524,937 A | 6/1996 | Sides, III et al. | |
| 5,551,484 A * | 9/1996 | Charboneau | 138/104 |
| 5,558,375 A | 9/1996 | Newman | |
| 5,679,425 A | 10/1997 | Plumley | |
| 5,692,545 A | 12/1997 | Rodrigue | |
| 5,718,956 A | 2/1998 | Gladfelter et al. | |
| 5,778,938 A * | 7/1998 | Chick et al. | 138/98 |
| 5,785,091 A | 7/1998 | Barker, II | |
| 5,826,623 A | 10/1998 | Akiyoshi et al. | |
| 5,865,216 A * | 2/1999 | Youngs | 138/135 |
| 5,868,169 A | 2/1999 | Catallo | |
| 5,902,958 A | 5/1999 | Haxton | |
| 5,913,357 A | 6/1999 | Hanazaki et al. | |
| 5,979,506 A | 11/1999 | Aarseth | |
| 5,988,702 A | 11/1999 | Sas-Jaworsky | |
| 6,032,699 A * | 3/2000 | Cochran et al. | 138/104 |
| 6,065,540 A | 5/2000 | Thomeer et al. | |
| 6,076,561 A | 6/2000 | Akedo et al. | |
| 6,109,306 A | 8/2000 | Kleinert | |
| 6,123,110 A * | 9/2000 | Smith et al. | 138/98 |
| RE37,109 E | 3/2001 | Ganelin | |
| 6,264,244 B1 | 7/2001 | Isennock et al. | |
| 6,397,895 B1 | 6/2002 | Lively | |
| 6,538,198 B1 | 3/2003 | Wooters | |
| 6,557,485 B1 | 5/2003 | Sauter et al. | |
| 6,557,905 B2 | 5/2003 | Mack et al. | |
| 6,561,278 B2 | 5/2003 | Restarick et al. | |
| 6,585,049 B2 | 7/2003 | Leniek, Sr. | |
| 6,620,475 B1 | 9/2003 | Reynolds, Jr. et al. | |
| 6,634,675 B2 * | 10/2003 | Parkes | 285/55 |
| 6,691,781 B2 | 2/2004 | Grant et al. | |
| 6,706,398 B1 | 3/2004 | Revis | |
| 6,746,737 B2 | 6/2004 | Debalme et al. | |
| 6,773,774 B1 | 8/2004 | Crook et al. | |
| 6,787,207 B2 | 9/2004 | Lindstrom et al. | |
| 6,803,082 B2 | 10/2004 | Nichols et al. | |
| 6,807,988 B2 | 10/2004 | Powell et al. | |
| 6,868,906 B1 | 3/2005 | Vail, III et al. | |
| 6,889,716 B2 | 5/2005 | Lundberg et al. | |
| 6,902,205 B2 | 6/2005 | Bouey et al. | |
| 6,935,376 B1 * | 8/2005 | Taylor et al. | 138/98 |
| 7,000,644 B2 * | 2/2006 | Ichimura et al. | 138/109 |
| 7,021,339 B2 | 4/2006 | Hagiwara et al. | |
| 7,025,580 B2 * | 4/2006 | Heagy et al. | 425/11 |
| 7,069,956 B1 * | 7/2006 | Mosier | 138/138 |
| 7,306,006 B1 * | 12/2007 | Cornell | 137/565.01 |
| 7,328,725 B2 | 2/2008 | Henry et al. | |
| 7,523,765 B2 | 4/2009 | Quigley et al. | |
| 7,600,537 B2 | 10/2009 | Bhatnagar et al. | |
| 7,647,948 B2 | 1/2010 | Quigley et al. | |
| 8,187,687 B2 | 5/2012 | Wideman et al. | |
| 2001/0013669 A1 | 8/2001 | Cundiff et al. | |
| 2001/0025664 A1 | 10/2001 | Quigley et al. | |
| 2002/0040910 A1 | 4/2002 | Pahl | |
| 2002/0081083 A1 | 6/2002 | Griffioen et al. | |
| 2002/0094400 A1 | 7/2002 | Lindstrom et al. | |
| 2003/0008577 A1 | 1/2003 | Quigley et al. | |
| 2003/0087052 A1 | 5/2003 | Wideman et al. | |
| 2004/0014440 A1 | 1/2004 | Makela et al. | |
| 2004/0025951 A1 | 2/2004 | Baron et al. | |
| 2004/0052997 A1 | 3/2004 | Santo | |
| 2004/0074551 A1 | 4/2004 | McIntyre | |
| 2004/0094299 A1 | 5/2004 | Jones | |
| 2004/0134662 A1 | 7/2004 | Chitwood et al. | |
| 2004/0226719 A1 | 11/2004 | Morgan et al. | |
| 2004/0265524 A1 | 12/2004 | Wideman et al. | |
| 2005/0087336 A1 | 4/2005 | Surjaatmadja et al. | |
| 2006/0000515 A1 * | 1/2006 | Huffman | 138/114 |
| 2006/0054235 A1 | 3/2006 | Cohen et al. | |
| 2006/0249508 A1 | 11/2006 | Teufl et al. | |
| 2007/0187103 A1 | 8/2007 | Crichlow | |
| 2007/0246459 A1 | 10/2007 | Loveless et al. | |
| 2008/0164036 A1 | 7/2008 | Bullen | |
| 2008/0210329 A1 | 9/2008 | Quigley et al. | |
| 2009/0090460 A1 | 4/2009 | Wideman et al. | |

(56) References Cited

U.S. PATENT DOCUMENTS

| | | |
|---|---|---|
| 2009/0173406 A1 | 7/2009 | Quigley et al. |
| 2009/0194293 A1 | 8/2009 | Stephenson et al. |
| 2010/0101676 A1 | 4/2010 | Quigley et al. |

FOREIGN PATENT DOCUMENTS

| | | |
|---|---|---|
| EP | 0203887 A2 | 12/1986 |
| EP | 0427306 A2 | 5/1991 |
| EP | 0477704 A1 | 4/1992 |
| EP | 0503737 A1 | 9/1992 |
| EP | 0536844 A1 | 4/1993 |
| EP | 0681085 A2 | 11/1995 |
| EP | 0953724 A2 | 11/1999 |
| GB | 2103744 A | 2/1983 |
| GB | 2159901 A | 12/1985 |
| JP | 163 592 | 6/1990 |
| WO | WO-95/02782 A1 | 1/1995 |
| WO | WO-97/12115 A2 | 4/1997 |
| WO | WO-9712166 A1 | 4/1997 |
| WO | WO-9748932 A1 | 12/1997 |
| WO | WO-99/19653 A1 | 4/1999 |
| WO | WO-9961833 A1 | 12/1999 |
| WO | WO-0009928 A1 | 2/2000 |
| WO | WO-0073695 A1 | 12/2000 |
| WO | WO-2006003208 A1 | 1/2006 |

OTHER PUBLICATIONS

Dalmolen "The Properties, Qualification, and System Design of, and Field Experiences with Reinforced Thermoplastic Pipe for Oil and Gas Applications" NACE International, 2003 West Conference (Feb. 2003).

Fiberspar Tech Notes, "Horizontal well deliquification just got easier-with Fiberspar Spoolable Production Systems," TN21-R1UN1-HybridLift, 2010, 2 pages.

International Search Report and Written Opinion for International Patent Application No. PCT/US2010/060582 mailed on Feb. 16, 2011 (10 pages).

Mesch, K.A., "Heat Stabilizers," Kirk-Othmer Encyclopedia of Chemical Technology, 2000 pp. 1-20.

Sperling, L.H., "Introduction to Physical Polymer Science 3rd Edition," Wiley-Interscience, New York, NY, 2001, p. 100.

* cited by examiner

DUAL CONTAINMENT SYSTEMS, METHODS AND KITS

CROSS-REFERENCE TO RELATED APPLICATIONS

This application claims priority to and the benefit of U.S. provisional patent application Ser. No. 60/784,656, filed Mar. 22, 2006, the entirety of which is being incorporated herein by reference in its entirety.

FIELD OF THE INVENTION

The present invention relates generally to the field of spoolable tubing, and more particularly to a spoolable tube for conveying a fluid including an inner layer and a reinforcing layer.

BACKGROUND

Transporting fluids and mixtures of fluids may require careful handling, for example, when a fluid mixture includes a toxic fluid. An example of such a fluid is sour gas, which is natural gas that may contain up to, or over, 20% hydrogen sulfide contaminant by weight. Sour gas may also contain aromatic hydrocarbons, for example, benzene, toluene, xylenes and ethylbenzene. As is well known, hydrogen sulfide and such aromatic hydrocarbons may be toxic.

For example, the presence of hydrogen sulfide ($H_2S$) in transportable fluids can give rise to critical safety problems. In humans, the recommended exposure limit for $H_2S$ is 10 ppm per 10 minutes of exposure. The gas is immediately lethal at a concentration of about 300 ppm, which is comparable to the toxicity of hydrogen cyanide. The human nose can detect concentrations as low as 0.02 ppm and its maximum sensitivity is about 5 ppm; the nose becomes increasingly unable to detect hydrogen sulfide at concentrations of 150-200 ppm.

The presence of hydrogen sulfide and other toxic fluids also brings special demands on the materials for installations handling and the transport of fluids, as many metals are sensitive to, for example, sulfide stress cracking. During transport along a pipe, for example, fluids such as sour gas may partially separate and/or permeate the pipe, thus releasing toxic fluids into the pipe surroundings. When such a pipe includes for example an outer jacket, such escaped fluids may potentially cause burst or fracture of the pipe and/or the outer jacket.

Spoolable tubing, or tubing capable of being spooled upon a reel, is commonly used in numerous oil well operations, although other applications exist. For example, spoolable pipe may be used in gathering applications that, for example, transport produced fluids from the individual well head to transportation pipeline, or in other oil well operations include running down hole with well tools, or working over wells by delivering various chemicals down hole, and performing operations on the interior surface of the well bore. The tubes are spoolable so that a tube for example, can be used in long continuous lengths with a minimum number of joints, or with one well, and then transported on a reel to another well at a different location.

There is a need for a system that includes spoolable pipe which may not be susceptible to, for example, gas contaminants, and/or that provides for removal of such contaminants in a safe manner.

The procedure to construct a composite tube that is capable of spooling for transport or deployment, and able to resist high internal pressure loads or axial tensile or compressive loads involves using complex composite mechanics engineering principles to ensure that the tube has sufficient strength. Examples of composite tubes are presented in U.S. Pat. Nos. 5,921,285, 6,016,845, 6,004,639, 6,148,866, 6,286,558, 6,357,485, and 6,604,550 the entireties of which are incorporated herein by reference in their entireties.

SUMMARY

Disclosed is a system for conveying a fluid comprising a spoolable tube comprising an inner layer which defines a first passage for conveying a first fluid; and an outer layer, where the spoolable tube also includes a second passage for conveying a second fluid and one or more fittings adapted to engage an axial end of said inner layer and an axial end of said outer layer.

For example, a system conveying a fluid is disclosed comprising: a spoolable tube that comprises an inner layer, where the inner layer comprises a first layer and a reinforcing layer comprising fiber and wherein the inner layer defines a first passage for conveying a first fluid, an outer layer; an annular space between the inner and the outer layer defining a second passage for conveying a second fluid; and one or more fittings adapted to engage an axial end of the inner layer and an axial end of the outer layer. The first passage may be capable of conveying a first fluid at a first pressure and the second passage may be capable of conveying said second fluid at a second pressure. For example, the pressure of a second fluid transported within the second passage may be less than or equal to the pressure of the first fluid transported in the first passage.

In some embodiments, a second passage may comprise one or more physical perturbations such as channels or grooves. In other embodiments, the outer surface of the inner layer and/or the inner surface outer layer may include a physical perturbation such as a post, ridge, cleft, bump, groove or channel, and may be in some embodiments axially or helically oriented. Such a physical perturbation may be discontinuous or continuous along the axial length of the tube. For example, the outer surface of a reinforcing layer may include an axial or helically placed multi-filament yarn.

The system disclosed herein includes a fitting. Such a fitting may comprise a first seal adapted to reversibly seal the first passage of the pipe disclosed herein and may also comprise a second seal adapted to reversibly seal the second passage of the pipe. The fitting may include a means to measure the pressure of the second fluid and/or a means to measure the pressure of the first fluid. Alternatively or additionally, the fitting of the system may include a means to limit the pressure of the second fluid, for example, the system or fitting may include a relief valve such as those known to persons skilled in the art.

The system may include a tube, wherein the first layer of the tube may comprise one or more of a polymer, an elastomer, or a metal. In some embodiments, the first layer may comprise a thermoplastic, such as for example, high density polyethylene, crosslinked polyethylene, polyvinylidene fluoride, polyamide, polyethylene terphthalate, or polypropylene, and combinations thereof. The tube of the disclosed system may include an outer layer that comprises one or more of a polymer, an elastomer, or a metal. In one embodiment, the outer layer comprises a thermoplastic, such as for example, high density polyethylene, crosslinked polyethylene, polyvinylidene fluoride, polyamide, polyethylene terphthalate, or polypropylene, and combinations thereof.

A reinforcing layer of the disclosed tubes may include fiber, such a glass, an aramid, a metal, a carbon, a ceramic, or a mineral, or combinations of these. Such a reinforcing layer may further comprise a matrix. For example, a reinforcing layer may include fibers embedded or encapsulated in a matrix, for example, embedded or encapsulated in a polymer such as for example a thermoplastic, or epoxy.

The tubes, systems, and kits disclosed herein may also include an energy conductor or a data conductor. Such an energy conductor may be disposed within, attached, or adjacent to a reinforcing layer of the tube, or an energy conductor may be disposed between the inner layer and the outer layer. An energy conductor may include a fiber optic cable, a fiber optic sensor, a metal, or an insulated metal. The disclosed fittings may also include a connection for an energy conductor or a data conductor.

The disclosed systems and kits also may include a fitting where, in one embodiment, the fitting may be adapted to engage said reinforcing layer and/or said outer layer, and/or adapted to seal on said inner layer and said outer layer.

The disclosed systems may further comprise a means to vent a first fluid transported or conveying within the first passage, and/or a means to vent a second fluid transported or conveying within the second passage.

Another aspect of this disclosure is a method for containment of a fluid, comprising providing a tube comprising an inner layer defining a first fluid pathway and an outer layer, thereby forming a second fluid pathway, or annulus, between said inner and outer layer, reversibly sealing said first fluid pathway at an axial end of said tube; and reversibly sealing said annulus at an axial end of said tube. The method may further comprise measuring the pressure of the fluid within the first fluid pathway and measuring the pressure of the fluid within the annulus. The method may further comprise limiting a first pressure of a first fluid in the first fluid pathway so that said first pressure is less than a pressure of a second fluid in the second fluid pathway.

In another aspect, a containment kit is disclosed herein comprising: a pipe comprising a thermoplastic inner layer, a reinforcing layer, and an outer layer, that includes at least two distinct passages for fluid; and a fitting that reversibly seals the two distinct passages for fluid.

Other objects and advantages will become apparent hereinafter in view of the specification and drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Disclosed is a spoolable tube that provides one, two, or more paths for conducting fluids (i.e., liquids and gases) along the length of the spoolable tube. For example, the spoolable tube can transmit fluids down a well hole for operations upon the interior surfaces of the well hole, the spoolable tube can transmit fluids or gases to hydraulic or pneumatic machines operably coupled to the spoolable tube, and/or the spoolable tube can be used to transmit fluids on surface from well holes to transmission or distribution pipelines. Accordingly, the spoolable tube can provide one, two or more conduits for powering and controlling hydraulic and/or pneumatic machines, and/or act as a conduit for fluids, for example gases or liquids.

Figure 1:
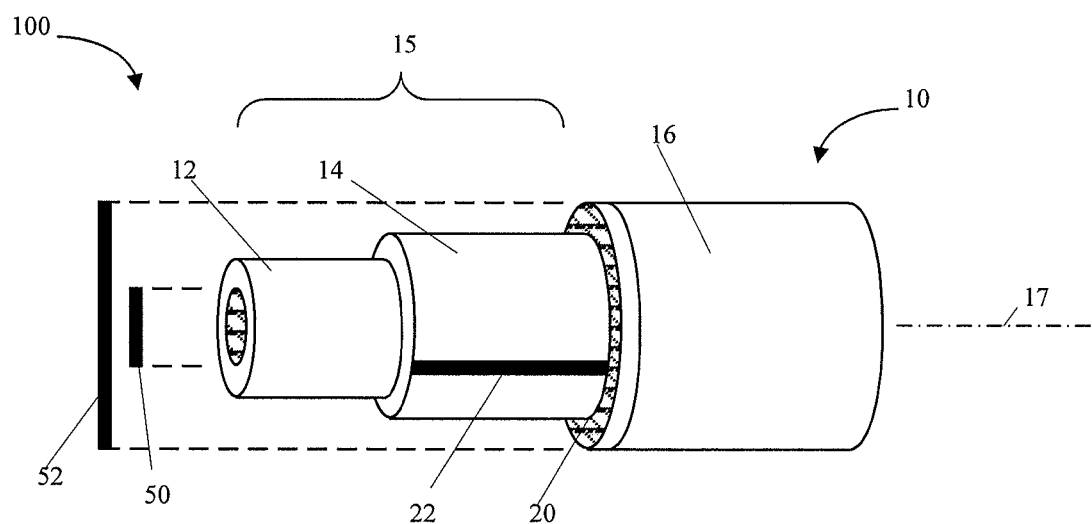
FIG. 1 is a side view, partially broken away, of a system that includes a spoolable tube with an inner layer and an outer layer with an annulus formed between the inner and outer layer and includes a fitting that includes a seal that seals a first fluid pathway and a seal that seals a second fluid pathway, in accordance with one embodiment of the invention.
Figure 2:
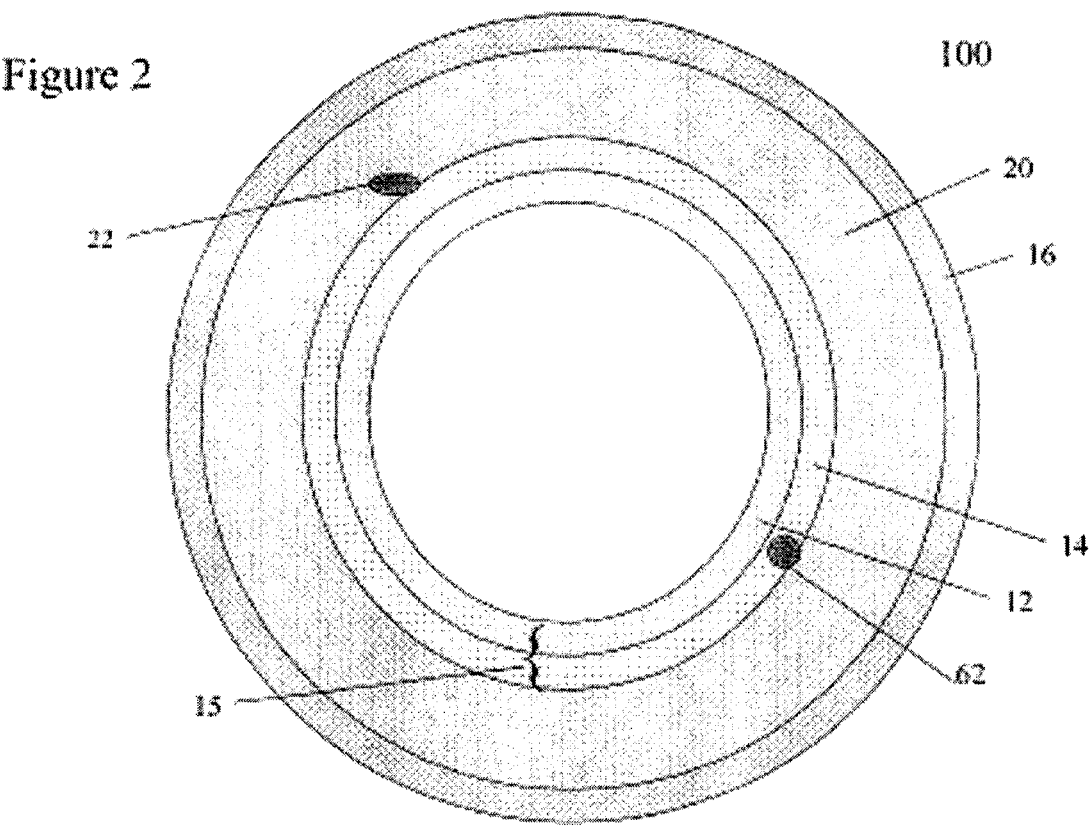
FIG. 2 is a cross-sectional view of a spoolable tube that includes an inner layer, and an outer layer with an annulus formed between the inner and outer layer, in accordance with one embodiment of the invention.

FIGS. 1 and 2 illustrate a system 100 that includes a tube 10 constructed of a first layer 12, a reinforcing layer 14 and at least one external layer 16 that may enclose the reinforcing layer(s) 14. The spoolable tube can be generally formed along a longitudinal axis 17. Although illustrated in FIG. 1 as having a circular cross-section, the disclosed spoolable tube can have a variety of tubular cross-sectional shapes, including but not limited to circular, oval, rectangular, square, polygonal, and/or others.

First layer 12, otherwise referred to as a liner, can serve as a pressure containment member to resist leakage of internal fluids from within the spoolable tube 10. In some embodiments, the first layer 12 can include a polymer, a thermoplastic, an elastomer, a rubber, a metal, co-polymer, and/or a composite. The composite can include a filled polymer and/or a nano-composite. Accordingly, first layer 12 can include one or more of a high density polyethylene (HDPE), a cross-linked polyethylene (PEX), a polyvinylidene fluoride (PVDF), a polyamide, polyethylene terphthalate, polyphenylene sulfide and/or a polypropylene. In one embodiment, the first layer 12 includes a modulus of elasticity greater than about approximately 50,000 psi, and/or a strength greater than about approximately 1,000 psi.

Referring back to FIG. 1, the spoolable tube 10 can also include one or more reinforcing layers 14. In one embodiment, the reinforcing layers can include fibers having, for example, at least a partially helical orientation relative to the longitudinal axis of the spoolable tube. The fibers may have a helical orientation between substantially about thirty degrees and substantially about seventy degrees relative to the longitudinal axis 17. For example, the fibers may be counterwound with a helical orientation of about ±40°, ±45°, ±50°, ±55°, and/or ±60°. The reinforcing layer may include fibers having multiple, different orientations about the longitudinal axis. Accordingly, the fibers may increase the load carrying strength of the reinforcing layer(s) 14 and thus the overall load carrying strength of the spoolable tube 10. In another embodiment, the reinforcing layer may carry substantially no axial load carrying strength along the longitudinal axis at a termination.

Exemplary fibers include but are not limited to graphite, KEVLAR, fiberglass, boron, polyester fibers, polymer fibers, mineral based fibers such as basalt fibers, and aramid. For example, fibers can include glass fibers that comprise e-cr glass, Advantex®, s-glass, d-glass, or a corrosion resistant glass.

The reinforcing layer(s) 14 can be formed of a number of plies of fibers, each ply including fibers. In one embodiment, the reinforcing layer(s) 14 can include two plies, which can optionally be counterwound unidirectional plies. The reinforcing layer(s) can include two plies, which can optionally be wound in about equal but opposite helical directions. The reinforcing layer(s) 14 can include four, eight, or more plies of fibers, each ply independently wound in a helical orientation relative to the longitudinal axis. Plies may have a different helical orientation with respect to another ply, or may have the same helical orientation. The reinforcing layer(s) 14 may include plies and/or fibers that have a partially and/or a substantially axial orientation. The reinforcing layer may include plies of fibers with an abrasion resistant material disposed between each ply, or optionally disposed between only certain plies. In some embodiments, an abrasion resistant layer is disposed between plies that have a different helical orientation.

The fibers can include structural fibers and flexible yarn components. The structural fibers can be formed of carbon, aramid, thermoplastic, and/or glass. The flexible yarn components, or braiding fibers, can be formed of either polyamide, polyester, aramid, thermoplastic, glass and/or ceramic. The fibers included in the reinforcing layer(s) 14 can be woven, braided, knitted, stitched, circumferentially (axially) wound, helically wound, and/or other textile form to provide an orientation as provided herein (e.g., in the exemplary embodiment, with an orientation between substantially about thirty degrees and substantially about seventy degrees relative to the longitudinal axis 17). The fibers can be biaxially or triaxially braided. The reinforcing layer(s) and/or fibers in the reinforcing layers can include a coating.

In one embodiment, the reinforcing layer(s) 14 includes fibers and a matrix. The reinforcing layer may be formed of one or more plies, each ply having one or more fibers disposed or embedded within a matrix, such as a polymer, glue, resin, coating, or thermoplastic. The fiber material and orientation can be selected to provide the desired mechanical characteristics for the reinforcing layer 14.

In some embodiments, an adhesive can be used to bond the reinforcing layer(s) 14 to first layer 12. In other embodiments, one or more reinforcing layers are substantially not bonded to one or more of other layers, such as the inner liner, internal pressure barriers, or external layer(s). First layer 12 and reinforcing layer 14 may form an inner layer 15. Inner layer 15 may include both a first layer 12 and a reinforcing layer 14, or may include only a first layer 12 or a reinforcing layer 14.

Alternatively, inner layer may include one, two or more layers that each individually comprise a metal, polymer, rubber, elastomer, or other material. In some embodiments, the inner layer defines a passage for conveying a first fluid. For example, the inner layer may define a first passage for conveying a first fluid that comprises on fluid, or a mixture of fluids, one or more of which may permeate through an inner layer 15. Such a fluid, for example, may also be conveyed along tube of system 100.

In certain exemplary embodiments, the matrix has a tensile modulus of at least 100,000 psi, preferably at least 250,000 psi, and has a maximum tensile elongation of at least 5%. In the case of a thermoset matrix, the matrix may have a glass transition temperature of at least 180° F. In the case of a thermoplastic matrix, the matrix may have a melt temperature of at least 250° F. The fibers may be structural fibers and/or flexible yarn components. The structural fibers may be formed of carbon, nylon, polyester, aramid, thermoplastic, glass, or other suitable fiber materials. The flexible yarn components, or braiding fibers, may be formed of nylon, polyester, aramid, thermoplastic, glass, or other suitable fiber materials. The fibers included in the reinforcing layer 14 can be woven, braided, knitted, stitched, circumferentially wound, or helically wound. In particular, the fibers can be biaxially or triaxially braided. The reinforcing layer 14 can be formed through pultrusion processes, braiding processes, or continuous filament winding processes. In certain exemplary embodiments, a tube formed of the liners and the composite layers disclosed herein may form a composite tube having a tensile strain of at least 0.25 percent and being capable of maintaining an open bore configuration while being spooled on a reel.

In some embodiments, external or outer layer 16 forms a second passage for conveying a second fluid, or annulus 20, between outer layer 16 and inner layer 15. Such fluid may be a result of fluid permeating through inner layer 15 to annulus 20. The outer layer(s) 16 may otherwise be understood to be an outer protective layer. In some embodiments, the external layer 16 is substantially unbonded to one or more of the reinforcing layer(s) 14, or substantially unbonded to one or more plies of the reinforcing layer(s) 14. The outer layer may be of unitary construction. In some embodiments, a second passage conveyed along annulus 20 may be capable of conveying a second fluid, where, in some embodiments, the second fluid is less than or equal to the pressure of a first fluid conveyed in the passage formed from an inner layer.

Annulus or fluid pathway 20 may further include one or more, or a plurality of, formed grooves or channels. Such grooves or channels may be formed from, for example, a polymer such as a thermoplastic. Grooves or channels within annulus 20 may be longitudinal passages that extend substantially or partially along the axial length of pipe 10. Such grooves may create axial flow paths for fluids that may permeate into the annulus from within inner layer of the composite tube. Such axial flow paths may terminate at an axial end of a tube.

Figure 4:
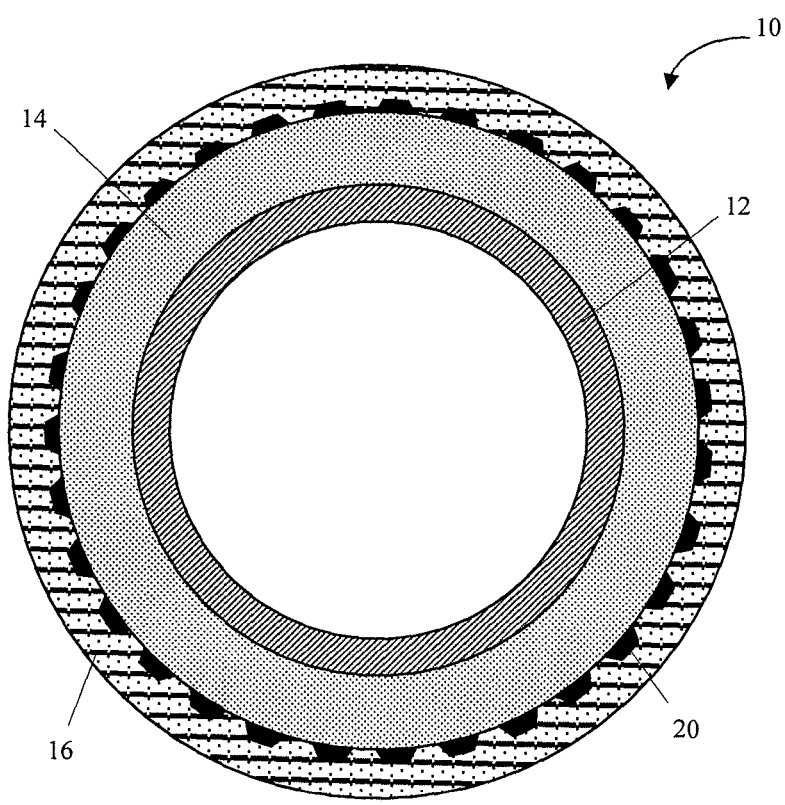
FIG. 4 is a cross-sectional view of a spoolable tube including a plurality of channels located between a reinforcing layer, and an outer layer, in accordance with one embodiment of the invention.

An example embodiment of the invention, including a plurality of channels 20, can be seen in FIG. 4. This embodiment can include a spoolable tube 10 including a first layer 12, at least one reinforcing layer 14, and at least one external layer 16 that may enclose the reinforcing layer(s) 14. A plurality of channels 20 can be located between the reinforcing layer 14 and at least one external layer 16 to provide a plurality of axial flow paths between these layers. In an alternative embodiment, these channels 20 may be located between any two or more layers of a spoolable tube 10.

In one embodiment, the channels 20 can be cut, molded, extruded or otherwise created on an inner surface of the external layer 16 during manufacture of the spoolable tube 10. Alternatively, the channels 20 can be cut, molded, extruded or otherwise created on an outer surface of the reinforcing layer 14, or created in both the inner surface of the external layer 16 and the outer surface of the reinforcing layer 14 in combination. In an alternative embodiment, the channels 20 can include separate hollow thin walled elements placed between the reinforcing layer 14 and at least one external layer 16 during or after manufacturing. These thin walled channels can be manufactured from a metal, plastic, composite material, or any other appropriate material with the required strength and thermal properties to provide appropriate flow paths between two or more layers of the spoolable tube 10.

Any number of channels 20 can be placed between the reinforcing layer 14 and at least one external layer 16, as required. These channels 20 can be placed at regular intervals around the circumference of the inner surface of the external layer 16, as shown in FIG. 4, or be located at one or more discrete, irregularly spaced locations around the inner surface of the external layer 16. In an alternative embodiment, a single channel may be located between the reinforcing layer 14 and at least one external layer 16.

In one embodiment of the invention, the plurality of channels 20 can be configured to run parallel, or substantially parallel, with a longitudinal axis of the spoolable tube 10. In an alternative embodiment, one or more channels 20 can be configured to spiral around the circumference of the inner surface of the external layer 16 at an angle to the longitudinal axis of the spoolable tube 10.

In one embodiment, the channels 20 can be substantially rectangular in shape, with the side walls configured to be substantially parallel with, or at a shallow angle to, a radial axis of the spoolable tube 10. In alternative embodiment, substantially square, curved, V-shaped, U-shaped, or any other appropriately shaped channels 20, or combinations thereof, may be incorporated into the spoolable tube 10. In general, these channels may be of any appropriate size, shape, and number to provide an appropriate flow field between the inner surface of the external layer 16 and the outer surface of the reinforcing layer 14, as required in a specific configuration of the invention.

Figure 3:
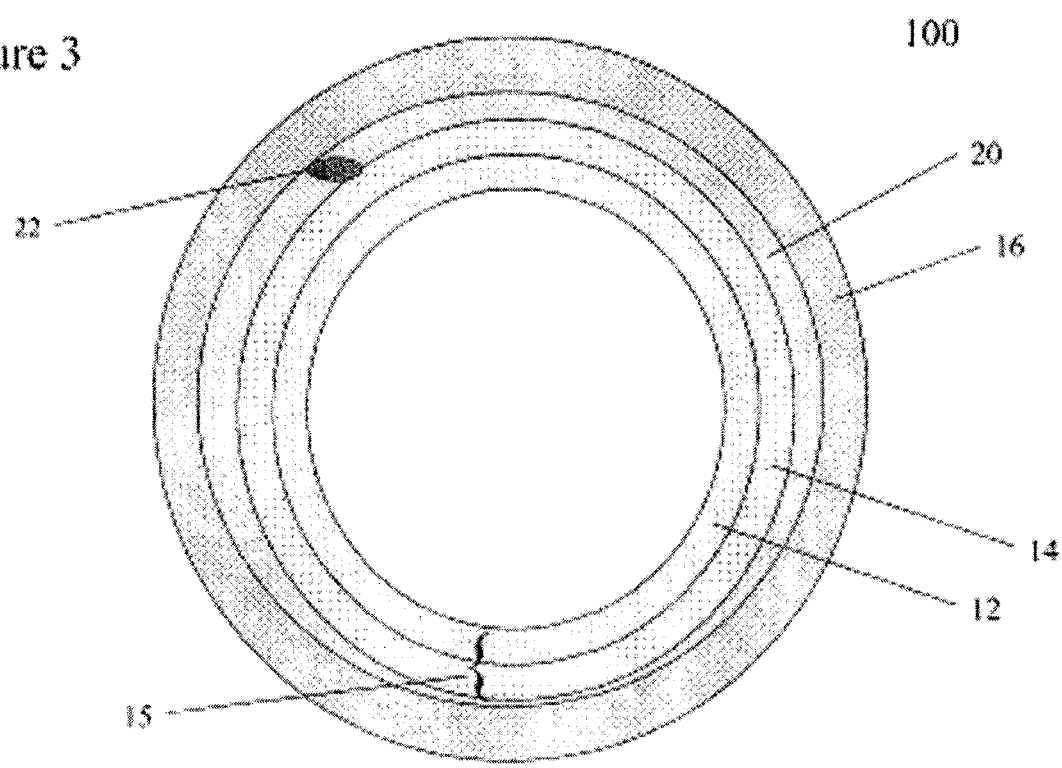
FIG. 3 is a cross-sectional view of a spoolable tube that includes an inner layer forming a first passage and an outer layer, where a physical perturbation forms a second passage, in accordance with one embodiment of the invention.

FIGS. 2 and 3 illustrate a system that includes a physical perturbation 22 disposed between the inner layer 15 and the outer layer 16. In some embodiments, such a perturbation may form an annulus 20, or a path for the axial movement of fluid within an annulus 20. For example, the outer surface of the inner layer 15 and/or the inner surface of the outer layer 16 may include such a physical perturbation. A physical perturbation may include for example a protrusion, a channel, groove, cleft, ridge, bump, or post. Such a physical perturbation may be either axially or helically oriented, in part or full, and/or a physical perturbation can be discontinuous or continuous along the axial length of the tube. For example, grooves may be applied on the outer surface of the inner layer, or the inner surface of the outer layer or both, or applied at least partially helically or axially to the exterior surface of the reinforcing layer, to provide a path for the axial movement of fluid through a second passage 20. In another example, a physical perturbation may include one or more bumps or protrusions on the outer surface of the inner layer 15 and/or the inner surface of the outer layer 16. In an embodiment, the tubes disclosed herein may comprise one, two or more physical perturbations.

For example, such a physical perturbation may include one or more multi-filament yarns disposed helically or axially on the outer surface of the inner layer 15 and/or the inner surface of the outer layer 16. Such a yarn may comprise for example glass or polymer and may include space between the yarn filaments that may allow fluids to move axially between inner layer 15 and outer layer 16. Such a physical perturbation, such as a multi-filament yarn, may assist in the prevention of trapped fluids between the inner and outer layers. Such trapped fluids, that can not reach, for example, vents at the ends of a pipe may increase the likelihood of pipe burst.

In other embodiments, a physical perturbation 22 may include a tracer wire that includes a metal, for example, copper or steel. A metallic tracer wire, for example, may assist in ascertaining the position of a buried pipe system that is otherwise metal free. Physical perturbation 22 may also include, e.g. a tape, a mesh, rope, yarn, string. Such embodiments of element 22 may comprise one or more of a metal, a polymer, a plastic, cellulose, or glass.

The outer or external layer(s) 16 can provide wear resistance and impact resistance. For example, the outer layer 16 can provide abrasion resistance and wear resistance by forming an outer surface to the spoolable tube that has a low coefficient of friction thereby reducing the wear on the reinforcing layers from external abrasion. Further, the external layer 16 can provide a seamless layer, to contain, for example, a fluid flowing between the inner 15 and outer layer 16. The external layer 16 can be formed of a filled or unfilled polymeric layer. Alternatively, the external layer 16 can be formed of a fiber, such as aramid or glass, with or without a matrix. Accordingly, the external layer 16 can be a polymer, thermoset plastic, a thermoplastic, an elastomer, a rubber, a co-polymer, and/or a composite, where the composite includes a filled polymer and a nano-composite. In some embodiments, outer layer(s) 16 can include one or more of high density polyethylene (HDPE), a cross-linked polyethylene (PEX), a polyvinylidene fluoride (PVDF), a polyamide, polyethylene terphthalate, polyphenylene sulfide and/or a polypropylene. The outer layer 16 can include a modulus of elasticity greater than about approximately 50,000 psi, and/or a strength greater than about approximately 1,000 psi. In an embodiment, the outer layer 16 can carry at least ten percent, twenty percent, twenty-five percent, thirty percent or even at least fifty percent of an axial load in the longitudinal direction at a termination. A seamless external layer can comprise, for example, a seamless thermoplastic.

In some embodiments, the external layer 16 can be formed by extruding, while the layer 16 can be formed using one or more materials applied at least partially helically and/or at least partially axial along the longitudinal axis 17. The material can include, for example, one or more polymeric tapes. In an example embodiment, the external layer 16 can include and/or otherwise have a coefficient of friction less than a coefficient of friction of a reinforcing layer 14.

Particles can be added to the external layer 16 to increase the wear resistance of the external layer 16. The particles used can include one or more of ceramics, metallics, polymerics, silicas, or fluorinated polymers. For example, adding TEFLON (MP 1300) particles and an aramid powder (PD-T polymer) to the external layer 16 can reduce friction and enhance wear resistance.

It can be understood that pressure from fluids transported by the spoolable tubes 10 disclosed herein may not be properly released from the reinforcing layer(s) 14, and/or from the inner layer 15, or the annulus 20 formed between the inner layer and the outer layer. Such accumulation of pressure can cause deterioration of the spoolable pipe 10, for example, external layer rupture or inner pressure barrier collapse. Further, such pressure may arise from toxic fluid permeating from fluids transported within the inner layer 15. Accordingly, in some embodiments, to allow for capture of such fluid and/or for pressure release along the length of the spoolable pipe 10, the instant pipe system includes one or more fittings. Such fittings may be adapted to engage an axial end of the inner layer 15 and/or the fluid path defined by inner layer 15, and may include one or more seals 50, 52. The one or more fittings may also be adapted to engage an axial end of the annulus 20. Referring to FIG. 1, seal 50 reversibly seals the fluid pathway defined by inner layer 15. Seal 52 may reversibly seal the annulus 20. In some embodiments, seals 50, 52 may each independently reversibly or irreversibly seal a fluid pathway.

For example, such couplings or fittings may engage with, be attached to, or in contact with one or more of the internal and external layers of a tube, and may act as a mechanical load transfer device. Couplings may engage one or both of the inner liner, the external wear layer or the reinforcing layer. Couplings or fittings may be comprised, for example, of metal or a polymer, or both. In some embodiments, such couplings may allow tubes to be coupled with other metal components, or to one or more containment receptacles for capturing independently fluids traveling along system 100. In addition, or alternatively, such couplings or fittings may provide a pressure seal or venting mechanism within or external to the tube. One or more couplings may each independently be in fluid communication with the inner layer and/or in fluid communication with the annulus formed between the one or more reinforcing layers and/or plies of fibers and the outer layer. Such couplings may provide venting, to the atmosphere, or to one or more containment devices, of any gasses or fluids that may be present in any of the layers or annuluses between the external layer and the inner layer, inclusive.

The pipe or tube system may also include a pressure seal or venting mechanism within the pipe or tube, such as, for example, a relief valve. One embodiment of the invention can include a connection system to transfer a fluid contained within the annulus and/or within the inner layer, pass it round a seal or connection element, and join it to another fluid containing region, such as an annulus and or inner layer of another adjoining or separate tube, a storage container, or a venting container. Alternatively, the fluid may be vented to the surrounding atmosphere, or to another appropriate safe or controlled area. Different venting mechanisms and/or connection systems may be coupled to the annulus and/or inner layer, as required. As a result, a fluid may be sealed within a single inner layer and/or annulus, connected between more than one inner layer and/or annulus, e.g the system is sealed across a connector, or can be vented to a separate containment element.

With reference to FIG. 2 the disclosed spoolable tubes 10 can also include one or more energy conductors 62 that can, for example, be integral with a wall of the spoolable pipe. Accordingly, the energy conductors 62 can be integral with the first layer, reinforcing layer(s), and/or exist between such first layer 12 and reinforcing layer 14, and/or exist between the inner layer 15 and an external layer 16. In some embodiments, the energy conductor 62 can extend along the length of the spoolable tube 10. The energy conductors 62 can include an electrical guiding medium (e.g., electrical wiring), an optical and/or light guiding medium (e.g., fiber optic cable), a hydraulic power medium (e.g., a high pressure tube or a hydraulic hose), a data conductor, and/or a pneumatic medium (e.g., high pressure tubing or hose).

The disclosed energy conductors 62 can be oriented in at least a partially helical direction relative to a longitudinal 17 axis of the spoolable tube 10, and/or in an axial direction relative to the longitudinal axis 17 of the spoolable tube 10.

A hydraulic control line embodiment of the energy conductor 62 can be either formed of a metal, composite, and/or a polymeric material.

In one embodiment, several energy conductors 62 can power a machine operably coupled to the coiled spoolable tube 10. For instance, a spoolable tube 10 can include three electrical energy conductors that provide a primary line 62, a secondary line 62, and a tertiary line 62 for electrically powering a machine using a three-phase power system. As provided previously herein, the spoolable tube 10 can also include internal pressure barriers 12 for transmitting fluids along the length of the tube 10. In some embodiments, the fittings of system 100 may also include a connection for an energy conductor, for example, to receive a energy conductor that forms part of a spoolable tube.

System 100 may also include a means for measuring the pressure of a first fluid being transported, for example, within a first passage defined by an inner layer of a spoolable tube, and an means for measuring the pressure of a second fluid being transported, for example, within an annular space between an inner and outer layer. Such means for measuring different pressure may include one or more devices. Such devices may include a manometer, a device that includes a piezoelectric sensor, a Bourden gauge, or a variable inducting diaphragm.

The pipe systems disclosed herein may also include leak detection means or fittings. Such leak detection means, as known to those skilled in the art, may be positioned along the spoolable pipe, positioned between the inner and outer layer of such spoolable pipe, or within fittings disposed on the axial ends.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

It should be understood that alternative embodiments, and/or materials used in the construction of embodiments, or alternative embodiments, are applicable to all other embodiments described herein.

Although the methods and systems have been described relative to a specific embodiment thereof, they are not so limited. Many modifications and variations may become apparent in light of the above teachings. Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A system for conveying a fluid comprising:
   a spoolable tube comprising:
   an inner layer which defines a first passage for conveying a first fluid, wherein said inner layer comprises a first layer and a reinforcing layer comprising fiber;
   an outer layer;
   an annular space between said inner and said outer layer defining a second passage comprising a plurality of channels for conveying a second fluid, wherein the plurality of channels extend substantially along an axial length of the spoolable tube; and,
   a first fitting adapted to engage an axial end of said inner layer and a second fitting adapted to engage an axial end of said outer layer, wherein said first fitting comprises a first venting mechanism for venting at least part of the first fluid and a first seal adapted to reversibly seal said first passage directly from the atmosphere or separate containment device, and wherein said second fitting comprises a second venting mechanism for venting at least part of the second fluid and a second seal adapted to reversibly seal said second passage directly from the atmosphere or separate containment device.

2. The system of claim 1, wherein said first passage is capable of conveying said first fluid at a first pressure and wherein said second passage is capable of conveying said second fluid at a second pressure.

3. The system of claim 2, wherein said second pressure is less than or equal to said first pressure.

4. The system of claim 2, wherein said second fitting includes a means to measure said second pressure.

5. The system of claim 2, wherein said second fitting includes a means to limit said second pressure.

6. The system of claim 2, wherein said second pressure is less than said first pressure.

7. The system of claim 1, further comprising a relief valve.

8. The system of claim 1, wherein said first layer comprises one or more of a polymer, an elastomer, or a metal.

9. The system of claim 8, wherein said first layer comprises a thermoplastic.

10. The system of claim 8, wherein said first layer comprises high density polyethylene, crosslinked polyethylene, polyvinylidene fluoride, polyamide, polyethylene terphthalate, or polypropylene, and combinations thereof.

11. The system of claim 1, wherein said outer layer comprises one or more of a polymer, an elastomer, or a metal.

12. The system of claim 11, wherein said outer layer comprises a thermoplastic.

13. The system of claim 11, wherein said outer layer comprises high density polyethylene, crosslinked polyethylene, polyvinylidene fluoride, polyamide, polyethylene terphthalate, or polypropylene, and combinations thereof.

14. The system of claim 1, wherein said fiber comprises one or more of a glass, an aramid, a metal, a carbon, a ceramic, or a mineral.

15. The system of claim 1, wherein said reinforcing layer further comprises a matrix.

16. The system of claim 15, wherein said fibers are embedded in said matrix.

17. The system of claim 15, wherein said matrix comprises an epoxy.

18. The system of claim 15, wherein said matrix comprises a polymer.

19. The system of claim 18, wherein said polymer comprises a thermoplastic polymer.

20. The system of claim 1, wherein said fibers are encapsulated by a polymer.

21. The system of claim 1, wherein said fibers further comprise a coating.

22. The system of claim 1, wherein said reinforcing layer further comprises an energy conductor or a data conductor.

23. The system of claim 1, further comprising an energy conductor disposed between the inner layer and the outer layer.

24. The system of claim 1, wherein at least one of said first and second fittings include a connection for an energy conductor or a data conductor.

25. The system of claim 24, wherein said energy conductor comprises at least one of: a fiber optic cable, a fiber optic sensor, a metal, or an insulated metal.

26. The system of claim 1, further comprising a physical perturbation disposed between said inner layer and said outer layer.

27. The system of claim 26, wherein said physical perturbation forms said second passage for conveying said second fluid.

28. The system of claim 27, wherein an outer surface of the reinforcing layer comprises said physical perturbation.

29. The system of claim 27, wherein said physical perturbation is axially or helically oriented.

30. The system of claim 28, wherein said physical perturbation comprises a multi-filament yarn.

31. The system of claim 1, wherein said outer layer is of unitary construction.

32. The system of claim 1, wherein said second passage comprises channels or grooves.

33. The system of claim 1, wherein an outer surface of said inner layer comprises a physical perturbation forming said annular space.

34. The system of claim 33, wherein said physical perturbation is a channel, groove, cleft, ridge, bump or post.

35. The system of claim 34, wherein said physical perturbation is discontinuous along the axial length of the tube.

36. The system of claim 34, wherein said physical perturbation is continuous along the axial length of the tube.

37. A method for containment of a fluid, comprising:
   providing a tube comprising an inner layer defining a first fluid pathway and an outer layer thereby forming a second fluid pathway between said inner and outer layer, said second fluid pathway comprising a plurality of channels extending substantially along an axial length of the tube;
   reversibly sealing said first fluid pathway directly from the atmosphere or separate containment device at an axial end of said tube with a first fitting comprising a first venting mechanism for venting at least part of a first fluid in the first fluid pathway; and
   reversibly sealing said second fluid pathway directly from the atmosphere or separate containment device at an axial end of said tube with a second fitting comprising a second venting mechanism for venting at least part of a second fluid in the second fluid pathway.

38. The method of claim 37, further comprising measuring the pressure of the first fluid pathway and measuring the pressure of the second fluid pathway.

39. The method of claim 38, further comprising limiting a first pressure of the first fluid so that said first pressure is less than a pressure of the second fluid.

40. A containment kit comprising:
   a pipe comprising a thermoplastic inner layer, a reinforcing layer, and an outer layer, that includes at least two distinct passages for fluid, at least one of the passages comprising a plurality of channels extending substantially along an axial length of the tube; and a first fitting comprising a first venting mechanism for venting at least part of a first fluid in one of the passages and a second fitting comprising a second venting mechanism for venting at least part of a second fluid in the other passage, the first and the second fittings adapted to reversibly seal the two distinct passages for fluid directly from the atmosphere or separate containment device.

41. The containment kit of claim 40, further comprising a means for pressure measurement.

* * * * *